United States Patent
Kan et al.

(10) Patent No.: US 9,819,423 B2
(45) Date of Patent: Nov. 14, 2017

(54) LOW-COMPLEXITY MULTI-SYMBOL LOG-LIKELIHOOD RATIO (LLR) CALCULATION

(71) Applicant: Futurewei Technologies, Inc., Plano, TX (US)

(72) Inventors: Clarence Kan, Bridgewater, NJ (US); Wei-Ren Peng, Santa Clara, CA (US); Yan Cui, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/990,004

(22) Filed: Jan. 7, 2016

(65) Prior Publication Data

US 2017/0201329 A1  Jul. 13, 2017

(51) Int. Cl.
*H04B 10/69* (2013.01)
*H04L 1/00* (2006.01)
*H04L 27/00* (2006.01)

(52) U.S. Cl.
CPC ......... *H04B 10/695* (2013.01); *H04L 1/0052* (2013.01); *H04L 27/0008* (2013.01)

(58) Field of Classification Search
CPC .. H04B 10/695; H04L 1/0052; H04L 27/0008
USPC ....................................................... 375/261
See application file for complete search history.

(56) References Cited

U.S. PATENT DOCUMENTS

| | | | |
|---|---|---|---|
| 8,166,379 B1* | 4/2012 | Wu | H03M 13/3723 714/794 |
| 2009/0196382 A1 | 8/2009 | Stirling-Gallacher | |
| 2010/0172443 A1* | 7/2010 | Shim | H04B 1/7105 375/320 |
| 2014/0029509 A1* | 1/2014 | Murakami | H04B 7/0413 370/315 |

FOREIGN PATENT DOCUMENTS

| | | |
|---|---|---|
| CN | 104283835 A | 1/2015 |
| CN | 105162545 A | 12/2015 |
| EP | 2448203 A1 | 5/2012 |

OTHER PUBLICATIONS

Le, Anh Tuan, et al., "A Group of Modulation Schemes for Adaptive Modulation," Nov. 19-21, 2008 IEEE, ICCS, pp. 864-869.

(Continued)

*Primary Examiner* — Michael Neff
(74) *Attorney, Agent, or Firm* — Conley Rose, P.C.

(57) ABSTRACT

An apparatus comprising a receiver configured to receive a super-symbol comprising a first modulation symbol and a second modulation symbol, wherein the first modulation symbol comprises a first modulation format, and wherein the second modulation symbol comprises a second modulation format, and a processor coupled to the receiver and configured to select, for the first modulation symbol, a first nearest candidate symbol from a first set of candidate symbols associated with the first modulation format, select, for the second modulation symbol, a second nearest candidate symbol independent of the first nearest candidate symbol from a second set of candidate symbols associated with the (Continued)

second modulation format, and determine a soft decision value for a first hit in the super-symbol according to the first nearest candidate symbol and the second nearest candidate symbol.

20 Claims, 12 Drawing Sheets

(56) References Cited

OTHER PUBLICATIONS

Machine Translation and Abstract of Chinese Publication No. CN104283835, dated Jan. 14, 2015, 21 pages.
Machine Translation and Abstract of Chinese Publication No. CN105162545, dated Dec. 16, 2015, 12 pages.
Foreign Communication From a Counterpart Application, PCT Application No. PCT/CN2017/000007, English Translation of International Search Report dated Mar. 31, 2017, 4 pages.

* cited by examiner

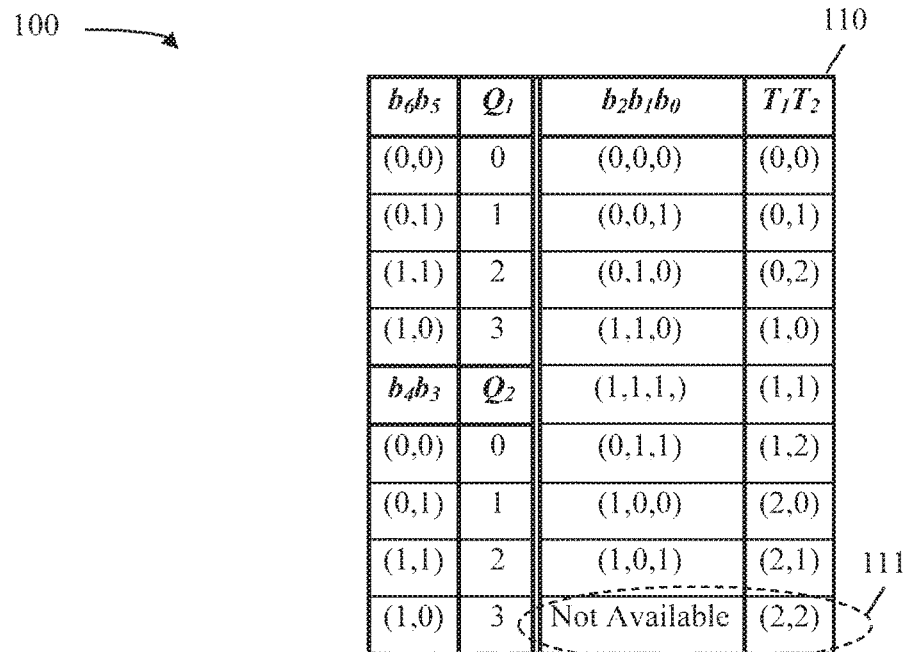
FIG. 1A
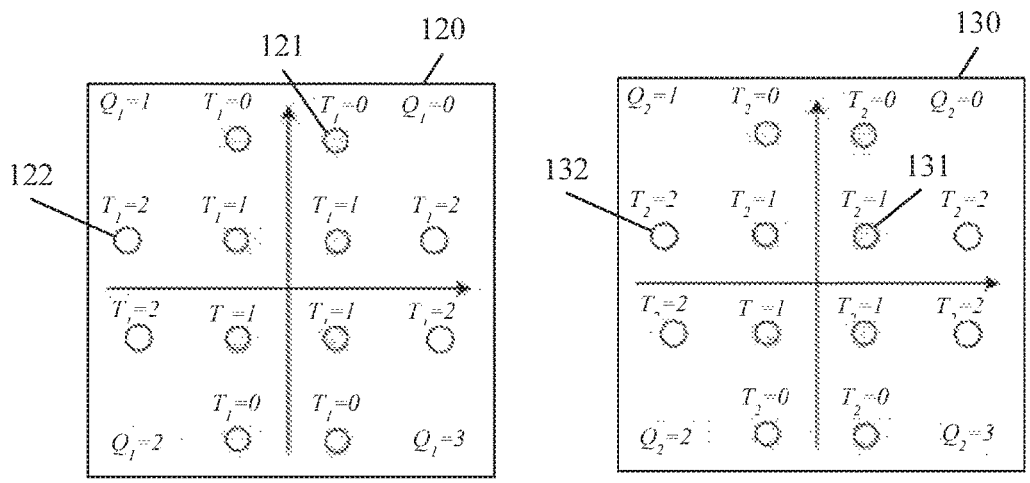
FIG. 1B
FIG. 1C

600
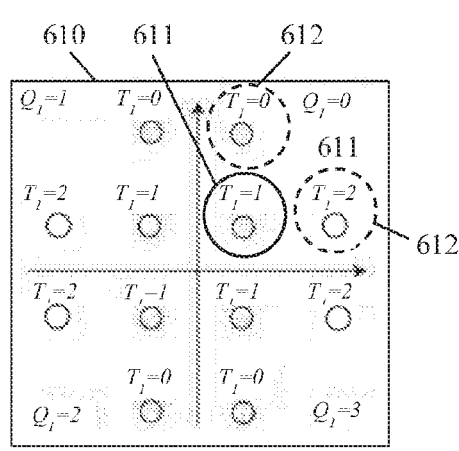
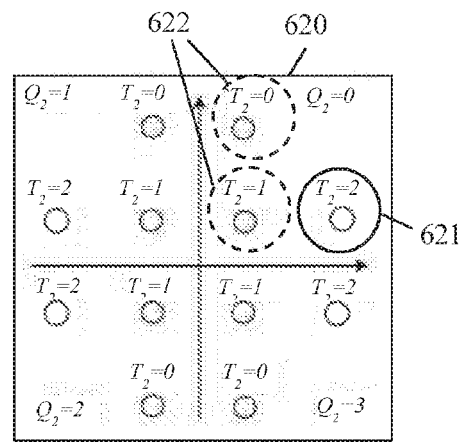
FIG. 6A     FIG. 6B
| Valid Combinations 630 | |
|---|---|
| T₁ | T₂ |
| 0 | 0 |
| 0 | 2 |
| 1 | 0 |
| 2 | 0 |
631
FIG. 6C

| Bit Value | Invalid Super-symbols | | Valid Neighboring Super-Symbols | | | |
|---|---|---|---|---|---|---|
| | $T_1$ | $T_2$ | $T_1$ | $T_2$ | $T_1$ | $T_2$ |
| $b_6, b_5, b_4, b_3 = 0$ or $1$ | 2 | 2 | 0 | 2 | 1 | 2 |
| $b_0 = 0$ | 1 | 2 | 2 | 0 | 2 | 1 |
| $b_0 = 0$ | 2 | 2 | 0 | 2 | 1 | 0 |
| $b_0 = 1$ | 0 | 2 | 0 | 2 | 2 | 0 |
| $b_0 = 1$ | 2 | 2 | 1 | 1 | 1 | 2 |
| $b_1 = 0$ | No invalid Super-symbols | | | | | 1 |
| $b_1 = 1$ | 0 | 0 | 0 | 2 | 1 | 0 |
| $b_1 = 1$ | 0 | 1 | 0 | 2 | 1 | 1 |
| $b_2 = 0$ | 1 | 0 | 0 | 0 | 1 | 2 |
| $b_2 = 0$ | 1 | 1 | 0 | 1 | 1 | 2 |
| $b_2 = 1$ | No invalid Super Symbols | | | | | |

FIG. 7

|  | Number of Additions/Subtractions Per Bit | Number of Multiplications Per Bit | Number of Comparison Operations Per Bit |
|---|---|---|---|
| Full LLR | 60.4 | 2.3 | 126 |
| Reduced LLR | 15 | 2.3 | 50.4 |
| Reduction % | 75 % | 0 % | 60 % |

|  | Gate Counts (millions) |
|---|---|
| Full LLR | 6.5 |
| Reduced LLR | 2.7 |
| Reduction % | 82 % |

LOW-COMPLEXITY MULTI-SYMBOL LOG-LIKELIHOOD RATIO (LLR) CALCULATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical fibers have been widely used for providing high-speed communication links. Optical links employing optical fibers provide many advantages compared to electrical links. These advantages include large bandwidth, high noise immunity, reduced power dissipation, and reduced crosstalk. The rapid growth of optical networks and the need for greater capacity has led research and industry to employ more advanced and higher-order modulation schemes.

SUMMARY

In one embodiment, the disclosure includes an apparatus comprising a receiver configured to receive a super-symbol comprising a first modulation symbol and a second modulation symbol, wherein the first modulation symbol comprises a first modulation format, and wherein the second modulation symbol comprises a second modulation format, and a processor coupled to the receiver and configured to select, for the first modulation symbol, a first nearest candidate symbol from a first set of candidate symbols associated with the first modulation format, select, for the second modulation symbol, a second nearest candidate symbol independent of the first nearest candidate symbol from a second set of candidate symbols associated with the second modulation format, and determine a soft decision value for a first bit in the super-symbol according to the first nearest candidate symbol and the second nearest candidate symbol. In some embodiments, the disclosure also includes the first modulation format comprising a first plurality of constellation points, wherein the second modulation format comprises a second plurality of constellation points, and wherein the processor is further configured to select the first set of candidate symbols for the first modulation symbol from the first plurality of constellation points according to a bit position of the first bit and a bit value of the first bit in a pre-determined bit-to-symbol map of the super-symbol, and select the second set of candidate symbols for the second modulation symbol from the second plurality of constellation points according to the bit position and the first bit value, and/or or the processor is further configured to compute first distance metrics according to the first modulation symbol and the first set of candidate symbols, and compute second distance metrics according to the second modulation symbol and the second set of candidate symbols, wherein the first nearest candidate symbol comprises a minimum first distance metric among the first set of candidate symbols, and wherein the second nearest candidate symbol comprises a minimum second distance metric among the second set of candidate symbols, and/or wherein the first distance metrics and the second distance metrics are square Euclidean distances (SEDs), and/or to determine that a first combination of the first nearest candidate symbol and the second nearest candidate symbol forms a first valid super-symbol according to the pre-determined bit-to-symbol map, and further determine the soft decision value by computing a sum of the minimum first distance metric and the minimum second distance metric, and/or the first bit value comprises a value of zero, and wherein the processor is further configured to select a third set of candidate symbols for the first modulation symbol from the first plurality of constellation points according to the bit position and a second bit value of one for the first bit, select a fourth set of candidate symbols for the second modulation symbol from the second plurality of constellation points according to the bit position and the second bit value, compute third distance metrics according to the first modulation symbol and the third set of candidate symbols, and compute fourth distance metrics according to the second modulation symbol and the fourth set of candidate symbols, and/or to select a third nearest candidate symbol for the first modulation symbol from the third set of candidate symbols comprising a minimum third distance metric, select a fourth nearest candidate symbol for the second modulation symbol from the fourth set of candidate symbols comprising a minimum fourth distance metric, determine that a second combination of the third nearest candidate symbol and the fourth nearest candidate symbol forms a second valid super-symbol according to the pre-determined bit-to-symbol map, and further determine the soft decision value by subtracting the minimum third distance metric and the minimum fourth distance metric from the sum, and/or to determine that a combination of the first nearest candidate symbol and the second nearest candidate symbol forms an invalid super-symbol according to the pre-determined bit-to-symbol map, select a set of valid neighboring super-symbols, each comprising a third candidate symbol and a fourth candidate symbol, wherein the third candidate symbol corresponds to one of the first nearest candidate symbol and the second nearest candidate symbol, compute a joint distance metric for each valid neighboring super-symbol according to the first modulation symbol, the second modulation symbol, a corresponding third candidate symbol of each valid neighboring super-symbol, and a corresponding fourth candidate symbol of each valid neighboring super-symbol, select a nearest super-symbol from the set of valid neighboring super-symbols comprising a minimum joint distance metric, and further determine the soft decision value according to the minimum joint distance metric, and/or wherein the first modulation symbol and the second modulation symbol are 12 quadrature-amplitude modulation (12 QAM) symbols, and/or wherein the apparatus is an optical receiver.

In another embodiment, the disclosure includes a method comprising receiving a super-symbol comprising a first modulation symbol and a second modulation symbol corresponding to a plurality of bits, wherein the plurality of bits comprises a first bit at a bit position, assuming a first bit value for the first bit, computing first distance metrics for the first modulation symbol according to the bit position and the first bit value, computing second distance metrics for the second modulation symbol according to the bit position and the first bit value, and determining a log-likelihood ratio (LLR) for the first bit by separately selecting a minimum first distance metric from the first distance metrics and a minimum second distance metric from the second distance metrics. In some embodiments, the disclosure also includes the first modulation symbol comprising a first modulation format comprising a first set of constellation points, wherein the second modulation symbol comprises a second modulation format comprising a second set of constellation points, wherein computing the first distance metrics comprises identifying the first set of candidate symbols from the first set of constellation points according to the bit position and the first bit value in a pre-determined bit-to-symbol map, and computing first SEDs between the first modulation symbol and the first set of constellation points, and wherein computing the second distance metrics comprises identifying the second set of candidate symbols from the second set of constellation points according to the bit position and the first bit value in the pre-determined bit-to-symbol map, and computing second SEDs between the second modulation symbol and the second set of constellation points, and/or wherein the first bit value comprises a value of zero, wherein the method further comprises assuming a second bit value of one for the first bit, computing third distance metrics for the first modulation symbol according to the bit position and the second bit value in the pre-determined bit-to-symbol map, and computing fourth distance metrics for the second modulation symbol according to the bit position and the second bit value in the pre-determined bit-to-symbol map, and wherein the determining the LLR further comprises separately selecting a minimum third distance metric from the third distance metrics and a minimum fourth distance metric from the fourth distance metrics, and/or wherein the first minimum distance metric corresponds to a first nearest candidate symbol, wherein the second minimum distance metric corresponds to a second nearest candidate symbol, wherein the third minimum distance metric corresponds to a third nearest candidate symbol, wherein the fourth minimum distance metric corresponds to a fourth nearest candidate symbol, and wherein the determining the LLR further comprises determining that a first combination of the first nearest candidate symbol and the second nearest candidate symbol forms a first valid super-symbol according to the pre-determined bit-to-symbol-map, and determining that a second combination of the third nearest candidate symbol and the fourth nearest candidate symbol forms a second valid super-symbol according to the predetermined bit-to-symbol map, and/or the determining the LLR further comprises adding the minimum first distance metric and the minimum second distance metric to produce a first sum, adding the minimum third distance metric and the minimum third distance metric to produce a second sum, and subtracting the second sum from the first sum to produce the LLR, and/or wherein the first minimum distance metric corresponds to a first nearest candidate symbol, wherein the second minimum distance metric corresponds to a second nearest candidate symbol, and wherein the determining the LLR further comprises determining that a combination of the first nearest candidate symbol and the second nearest candidate symbol forms an invalid super-symbol according to the pre-determined bit-to-symbol-map, selecting one or more valid first valid neighboring super-symbols, each comprising the same first nearest candidate symbol for the first modulation symbol and a third candidate symbol for the second modulation symbol, selecting one or more second valid neighboring super-symbols, each comprising the same second nearest candidate symbol for the first modulation symbol and a fourth candidate symbol for the first modulation symbol, and selecting a nearest super-symbol from the first valid neighboring super-symbols and the second valid neighboring super-symbols, and/or wherein the selecting the nearest super-symbol comprises computing a joint distance metric for each first valid neighboring symbol by summing the minimum first distance metric and a third distance metric between the second modulation symbol and a corresponding third candidate symbol, computing a joint distance metric for each second valid neighboring symbol by summing the minimum second distance metric and a fourth distance metric between the first modulation symbol and a corresponding fourth candidate symbol, and selecting the nearest neighboring symbol from the first valid neighboring super-symbols and the second valid neighboring super-symbols comprising a minimum joint distance metric, and wherein the determining the LLR further comprises generating the LLR according to the minimum joint distance metric.

In yet another embodiment, the disclosure includes an optical device comprising a receiver coupled to an optical communication system and configured to receive an optical signal carrying a super-symbol comprising a first 12 QAM symbol and a second 12 QAM symbol corresponding to a plurality of bits in a pre-determined bit-to-symbol map, wherein the plurality of bits comprises a first bit at a bit position, and a soft decision generation unit coupled to the receiver and configured to assume a first bit value for the first bit, select, for the first modulation symbol, a first set of candidate symbols from a plurality of reference 12 QAM symbols according to the bit position and the first bit value, select, for the second modulation symbol, a second set of second candidate symbols from a plurality of reference 12 QAM symbols according to the bit position and the first bit value, compute first SEDs between the first modulation symbol and the first set of candidate symbols, compute second SEDs between the second modulation symbol and the second set of candidate symbols, and determine an LLR for the first bit by separately selecting a minimum first SED from the first SEDs and a minimum second SED from the second SEDs. In some embodiments, the disclosure also includes the soft decision generation unit further configured to determine the LLR by determining that a combination of a first nearest candidate symbol corresponding to the minimum first SED and a second nearest candidate symbol corresponding to the minimum second SED forms a valid super-symbol according to a pre-determined bit-to-symbol map of the super-symbol, and summing the minimum first SED and the minimum second SED, and/or wherein the soft decision generation unit is further configured to determine that a combination of a first nearest candidate symbol corresponding to the minimum first SED and a second nearest candidate symbol corresponding to the minimum second SED forms an invalid super-symbol according to the pre-determined bit-to-symbol map, select a set of valid neighboring super-symbols, each comprising a third candidate symbol and a fourth candidate symbol, wherein the third candidate symbol corresponds to one of the first nearest candidate symbol and the second nearest candidate symbol, compute a joint distance metric for each valid neighboring super-symbol according to the first modulation symbol, the second modulation symbol, a corresponding third candidate symbol of each valid neighboring super-symbol, and a corresponding fourth candidate symbol of each valid neighboring super-symbol, select a nearest super-symbol from the set of valid neighboring super-symbols comprising a minimum joint distance metric, and further determine the LLR according to the minimum joint distance metric.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1A is a table illustrating bit-to-symbol mapping for a dual-12 QAM super-symbol.

FIG. 1B is a constellation diagram of a first 12 QAM symbol in a dual-12 QAM super-symbol.

FIG. 1C is a constellation diagram of a second 12 QAM symbol in a dual-12 QAM super-symbol.

FIG. 6A illustrates a first 12 QAM symbol of an invalid super-symbol in a constellation plane according to an embodiment of the disclosure.

FIG. 6B illustrates a second 12 QAM symbol of an invalid super-symbol in a constellation plane according to an embodiment of the disclosure.

FIG. 6C is a table illustrating valid combinations for super-symbols according to an embodiment of the disclosure.

FIG. 7 is a table illustrating invalid super-symbols and corresponding valid neighboring super-symbols according to an embodiment of the disclosure.

DETAILED DESCRIPTION

Figure 2:
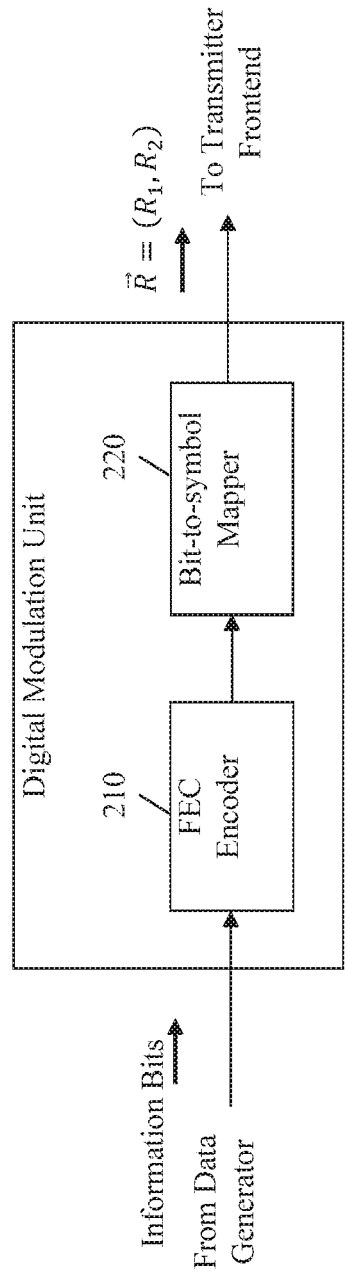
FIG. 2 is a schematic diagram of a digital modulation unit that generates dual-12 QAM super-symbols.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There is a growing demand to increase the capacity of long-haul optical communication systems. To achieve 200 gigabits per second (Gb/s) long-haul optical transmission, higher-order modulation such as 12 QAM is employed to transmit more data bits in the same bandwidth. 12 QAM provides several advantages over other high-order modulation schemes. For example, 12 QAM comprises higher filtering tolerances than 8 quadrature-amplitude modulation (8 QAM) and a greater transmission margin than 16 quadrature-amplitude modulation (16 QAM).

FIGS. 1A-1C illustrate a bit-to-symbol mapping scheme 100 for a super-symbol, represented by $\vec{S}$, comprising two 12 QAM symbols, represented by $S_1$ and $S_2$. The super-symbol is referred to as a dual-12 QAM super-symbol. Each of the 12 QAM symbols $S_1$ and $S_2$ is identified by a constellation quadrant and a constellation point within the constellation quadrant. The scheme 100 maps seven binary bits to each super-symbol $\vec{S}$, which is expressed as shown below:

$$b_6b_5b_4b_3b_2b_1b_0 \Rightarrow S=[S_1(Q_1kT_1),S_2(Q_2,T_2)], \quad (1)$$

where $Q_1$ is an integer varying from 0 to 3 representing the constellation quadrant index for the first 12 QAM symbol $S_1$, $T_1$ is an integer varying from 0 to 2 representing the constellation point index for the first 12 QAM symbol $S_1$, $Q_2$ is an integer varying from 0 to 3 representing the constellation quadrant index for the second 12 QAM symbol $S_2$, and $T_2$ is an integer varying from 0 to 2 representing the constellation point index for the second 12 QAM symbol $S_2$.

FIG. 1A is a table 110 illustrating bit-to-symbol mapping for the dual-12 QAM super-symbol $\vec{S}$. As shown, bits $b_6$ and $b_5$ are mapped to $Q_1$, bits $b_4$ and $b_3$ are mapped to $Q_2$, and bits $b_2$, $b_1$ and $b_0$ are mapped to $T_1$ and $T_2$. The two 12 QAM symbols $S_1$ and $S_2$ may be combined in 144 different combinations. However, the super-symbol $\vec{S}$ is represented by 7 bits. As such, the super-symbol $\vec{S}$ only allows for 128 combinations. Therefore, 16 out of the 144 combinations are invalid combinations for the super-symbol $\vec{S}$. The combination $T_1=2$ and $T_2=2$ shown by the dashed oval 111 is invalid irrespective of values of $Q_1$ and $Q_2$. Thus, the combination $T_1=2$ and $T_2=2$ is invalid for any constellation quadrant and any 12 QAM symbol.

FIG. 1B is a constellation diagram 120 of the first 12 QAM symbol $S_1$ in the dual-12 QAM super-symbol $\vec{S}$ in a complex plane. The circles represent the twelve constellation points of the first 12 QAM symbol $S_1$. Each constellation point is identified by a constellation quadrant index $Q_1$ and a constellation point index $T_1$. For example, the constellation point 121 corresponds to $Q_1=0$ and $T_1=0$, and the constellation point 122 corresponds to $Q_1=2$ and $T_1=2$.

FIG. 1C is a constellation diagram 130 of the second 12 QAM symbol $S_2$ in the dual-12 QAM super-symbol $\vec{S}$ in a complex plane. The constellation diagram 130 is identical to the constellation diagram 120. The circles represent the twelve constellation points of the second 12 QAM symbol $S_2$. Each constellation point is identified by a constellation quadrant index $Q_2$ and a constellation point index $T_2$. For example, the constellation point 131 corresponds to $Q_2=0$ and $T_2=1$, and the constellation point 132 corresponds to $Q_2=1$ and $T_2=2$.

As an example, to map a series of data bits $\{b_6b_5b_4b_3b_2b_1b_0=0000001\}$ to a dual-12 QAM super-symbol $\vec{S}$, where $b_0$ is a first bit in a group and $b_6$ is a last bit in the group, the values of the bits $b_2b_1b_0$ maps $T_1$ to a value of 0 and $T_2$ to a value of 1, the values of the bits $b_4b_3$ maps $Q_2$ to a value of 0, and the bits $b_5b_6$ maps $Q_1$ to a value of 0. Thus, the series of data bits are mapped to a first 12 QAM symbol with $S_1(Q_1=0, T_1=0)$ and a second 12 QAM symbol with $S_2(Q_1=0, T_2=1)$. Thus, a transmitter may transmit the two 12 QAM symbols $S_1$ and $S_2$ to represent the series of data bits. When a receiver receives the two 12 QAM symbols $S_1$ and $S_2$, the receiver may recover the series of data bits according to the table 110 and the constellation diagrams 120 and 130, as described more fully below.

FIG. 2 is a schematic diagram of a digital modulation unit 200 that generates dual-12 QAM super-symbols. The digital modulation unit 200 may be implemented via DSPs or hardware logics. The dual-12 QAM super-symbols are similar to the dual-12 QAM super-symbols described in the scheme 100. For example, each super-symbol comprises bit-to-symbol mapping as shown in table 110 and two 12 QAM symbols with constellations as shown in the constellation diagrams 120 and 130. The digital modulation unit 200 is employed by a transmitter in a communication network to modulate information bits for transmission. For example, the network may be a long-haul optical network and the transmitter may be an optical transmitter coupled to an optical transmission link in the network. The digital modulation unit 200 comprises an FEC encoder 210 coupled to a bit-to-symbol mapper 220.

The FEC encoder 210 is configured to receive a series of information data bits from a data generator and encodes the information data bits according to a forward error correction (FEC) scheme. FEC is widely employed in communication systems to provide reliable transmission of information. Some examples of FEC coding schemes include Viterbi, Reed-Solomon (RS), low-density parity-check (LDPC), and turbo code (TC).

The bit-to-symbol mapper 220 is configured to map the encoded data bits into super-symbols according to the scheme 100. For example, the bit-to-symbol mapper 220 maps the encoded data bits in groups of 7 bits, which are represented by $b_6b_5b_4b_3b_2b_1b_0$. For each group of 7 bits, the bit-to-symbol mapper 220 generates a first 12 QAM symbol $R_1$ and a second 12 QAM symbol $R_2$. The bit-to-symbol mapper 220 maps $b_6b_5$ to a $Q_1$ value and $b_2b_1b_0$ to a $T_1$ value to generate the first 12 QAM symbol $R_1$ according to the table 110. Similarly, the bit-to-symbol mapper 220 maps $b_4b_3$ to a $Q_2$ value and $b_2b_1b_0$ to a $T_2$ value to generate the second 12 QAM symbol $R_2$ according to the table 110. The 12 QAM symbols $R_1$ and $R_2$ are subsequently transmitted by an optical modulator. For example, the first 12 QAM symbol $R_1$ may be modulated onto an X-polarization component, and the second 12 QAM symbol $R_2$ may be modulated onto a Y-polarization component for transmission over an optical transmission channel. Alternatively, the first 12 QAM symbol $R_1$ and the second 12 QAM symbol $R_2$ are sequentially modulated onto an X-polarization component or a Y-polarization component for transmission over an optical transmission channel.

Figure 3:
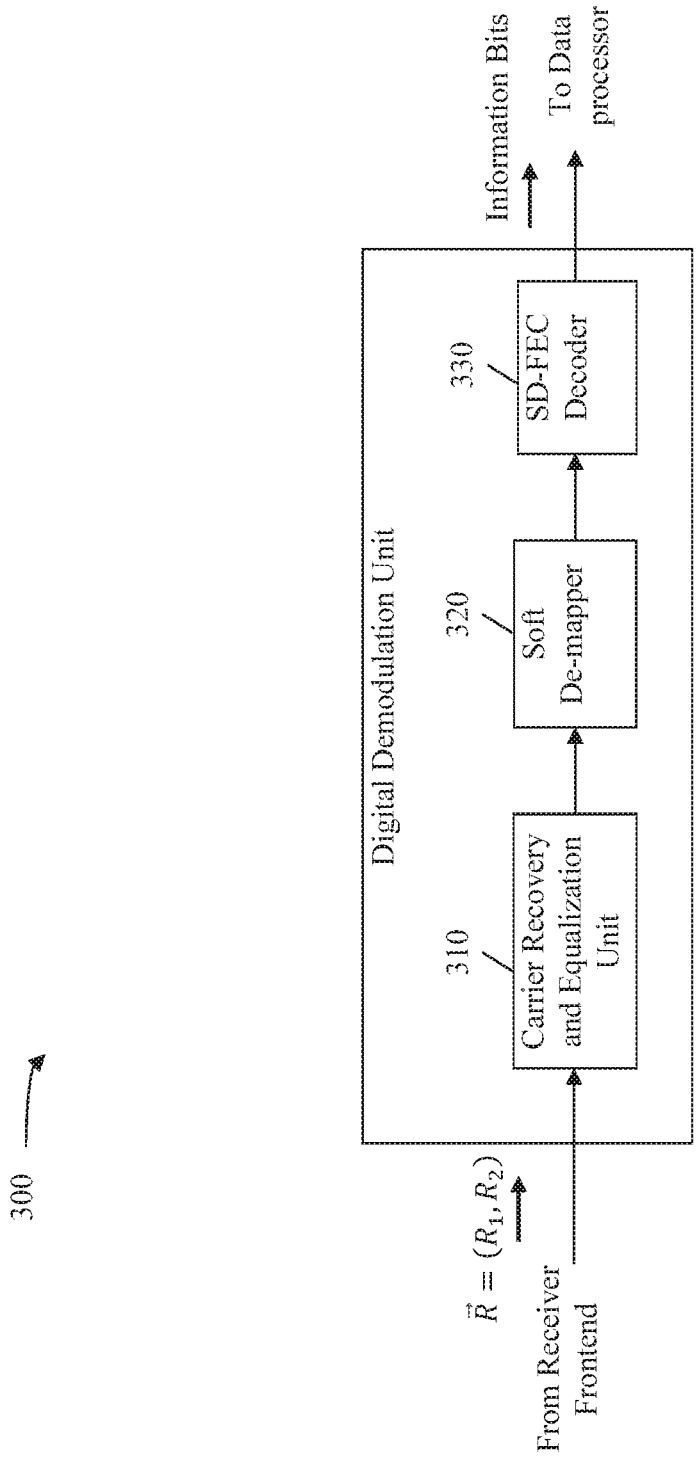
FIG. 3 is a schematic diagram of a digital demodulation unit that processes dual-12 QAM super-symbols.

FIG. 3 is a schematic diagram of a digital demodulation unit 300 that processes dual-12 QAM super-symbols. The digital demodulation unit 300 may be implemented via DSPs or hardware logics. The demodulation unit 300 is employed by a receiver in a communication network to recover information data bits from an incoming signal modulated by a modulator such as the digital modulation unit 200. The demodulation unit 300 comprises a carrier recovery and equalization unit 310, a soft de-mapper 320, and a soft decision-FEC (SD-FEC) decoder 330. The demodulation unit 300 is configured to receive an incoming signal carrying dual-12 QAM super-symbols from a transmission channel via a receiver frontend. The dual-12 QAM super-symbols are shown as $\vec{R}=(R_1, R_2)$, where $R_1$ represents the first 12 QAM symbol embedded in the super-symbol $\vec{R}$ and $R_2$ represents the second 12 QAM symbol embedded in the super-symbol $\vec{R}$. The received first and second 12 QAM symbols may include channel noise incurred during transmission. The super-symbol $\vec{R}$ comprises a length of 7 bits as shown in equation (1) and bit-to-symbol mappings as shown in the table 110. In one embodiment, one 12 QAM symbol is carried via an X-polarization component and the other 12 QAM symbol is carried via a Y-polarization component. In another embodiment, the two 12 QAM symbols may be carried in two successive X-polarization symbols or two successive Y-polarization symbols.

The carrier recovery and equalization unit 310 is configured to perform carrier recovery and channel equalization to produce an equalized signal. For example, carrier recovery may include the recovery of a phase of the carrier signal, and channel equalization may include the compensation of channel impairments and channel shaping caused by the transmission channel.

The soft de-mapper 320 is coupled to the carrier recovery and equalization unit 310. The soft de-mapper 320 is configured to determine soft bit decisions for the received dual-12 QAM super-symbols from the equalized signal. A soft bit decision refers to a confidence level of a decision of whether the incoming signal carries a binary of 1 or 0. The soft de-mapper 320 determines soft bit decisions in the form of log-likelihood ratios (LLRs). The soft de-mapper 220 computes an LLR for a $k^{th}$ bit of the received dual-12 QAM super-symbol $\vec{R}$ as follows:

$$LLR(b_k \mid \vec{R}) = \log\left(\frac{P(b_k = 1 \mid \vec{R})}{P(b_k = 0 \mid \vec{R})}\right), \quad (2)$$

where $b_k$ represents the $k^{th}$ bit of the received dual-12 QAM super-symbol $\vec{R}$, $P(b_k=1|\vec{R})$ represents the probability that the $k^{th}$ bit equals a value of 1, $P(b_k=0|\vec{R})$ represents the probability that the $k^{th}$ bit equals a value of 0, and log represents a logarithmic function. Assuming additive white Gaussian noise (AWGN) for transmission channel noise, equation (2) may be computed by employing the following approximation:

$$\ln(e^x+e^y)\approx\max(x,y), \quad (3)$$

where x and y may comprise any values and max represents a maximization function. By applying equation (3), aside from a multiplication constant, equation (2) is rewritten as follows:

$$LLR(b_k\vec{R})=\min(\{|S_{1,m}-R_1|^2+ |S_{2,n}-R_2|^2\}_{(m,n)\in\vec{S}\,(b_k=0)})-\min(\{|S_{1,m}-R_1|^2+ |S_{2,n}-R_2|^2\}_{(m,n)\in\vec{S}\,(b_k=1)}), \quad (4)$$

where $S_{1,m}$ represents a candidate 12 QAM symbol for $R_1$ and $S_{2,m}$, represents a candidate 12 QAM symbol for $R_2$. $S_{1,m}$ corresponds to one of the constellation points in the constellation diagram 120. $S_{2,m}$ corresponds to one of the constellation points in the constellation diagram 130. The term $|S_{1,m}-R_1|^2$ is an SED between the first 12 QAM symbol $R_1$ and a candidate 12 QAM symbol. The term $|S_{2,n}-R_2|^2$ is an SED between the second 12 QAM symbol $R_2$ and a candidate 12 QAM symbol. Thus, the soft de-mapper 320 computes an LLR for a $k^{th}$ bit of a received super-symbol by jointly minimizing SEDs between a first received 12 QAM symbols and candidate first 12 QAM symbols and a second received 12 QAM symbol and candidate second 12 QAM symbols.

The SD-FEC decoder 330 is coupled to the soft de-mapper 320 and configured to perform soft decoding based on the computed LLRs and the FEC coding scheme employed by a transmitter of the incoming signal. The SD-FEC decoder 330 produces information bits, which may be further processed by a data processor.

As described above, there are 128 combinations of $R_1$ and $R_2$ for a 7-bit super-symbol. Thus, according to equation (4), to determine an LLR for a received super-symbol, the soft de-mapper 320 is required to compute 128 four-dimensional (4D) SEDs per super-symbol or 18.3 4D SEDs per bit. As a comparison, 16 QAM LLR requires four two-dimensional (2D) SED calculations per bit. Thus, the LLR calculations for dual-12 QAM shown in equation (4) may be too computationally demanding and expensive for implementation.

Disclosed herein are embodiments of LLR computations for dual-12 QAM super-symbol with reduced computational complexity. The disclosed embodiments employ a soft de-mapper or a soft decision generation unit to generate a soft decision value or an LLR for each bit in a super-symbol. The super-symbol comprises a first 12 QAM symbol and a second 12 QAM symbol. Instead of jointly computing and minimizing 4D SEDs for the first 12 QAM symbol and the second 12 QAM symbol as shown in equation (4), the soft de-mapper independently selects a nearest candidate symbol for each 12 QAM symbol and for each bit value according to 2D SEDs. For example, for a given bit $b_k=0$, a first nearest candidate symbol is selected for the first 12 QAM symbol and a second nearest candidate symbol is selected for the second 12 QAM symbol. Similarly, for $b_k=1$, a third nearest candidate symbol is selected for the first 12 QAM symbol and a fourth nearest candidate symbol is selected for the second 12 QAM symbol. Depending on the bit-to-symbol map of the super-symbol, a combination of the first nearest candidate symbol and the second nearest candidate symbol may or may not form a valid super-symbol, as described more fully below. When the combination forms a valid super-symbol, an LLR is computed according to 2D SEDs of the first nearest candidate symbol and the second nearest candidate symbol. When the combination forms an invalid super-symbol, a nearest valid neighboring super-symbol is identified and the LLR is computed according to the nearest valid neighboring super-symbol, as described more fully below. Since SEDs comprise positive values, the independent selection or minimization of 2D SEDs is equivalent to the joint computation and minimization of 4D SEDs. Thus, the disclosed embodiments provide the same system performance as the joint 4D SED minimization. The disclosed embodiments may be implemented via digital signal processors (DSPs) or hardware logics. When compared to the joint 4D SED minimization, the disclosed embodiments reduces DSP computational complexity by about 60-70 percent (%) and hardware gate counts by about 80%. Thus, the disclosed embodiments may also reduce power consumption and hardware cost. Although the present disclosure describes the LLR computation mechanisms in the context of dual-12 QAM symbols, the disclosed embodiments are suitable for processing any multi-symbol super-symbols with any modulation format and any bit-to-symbol map.

Figure 4:
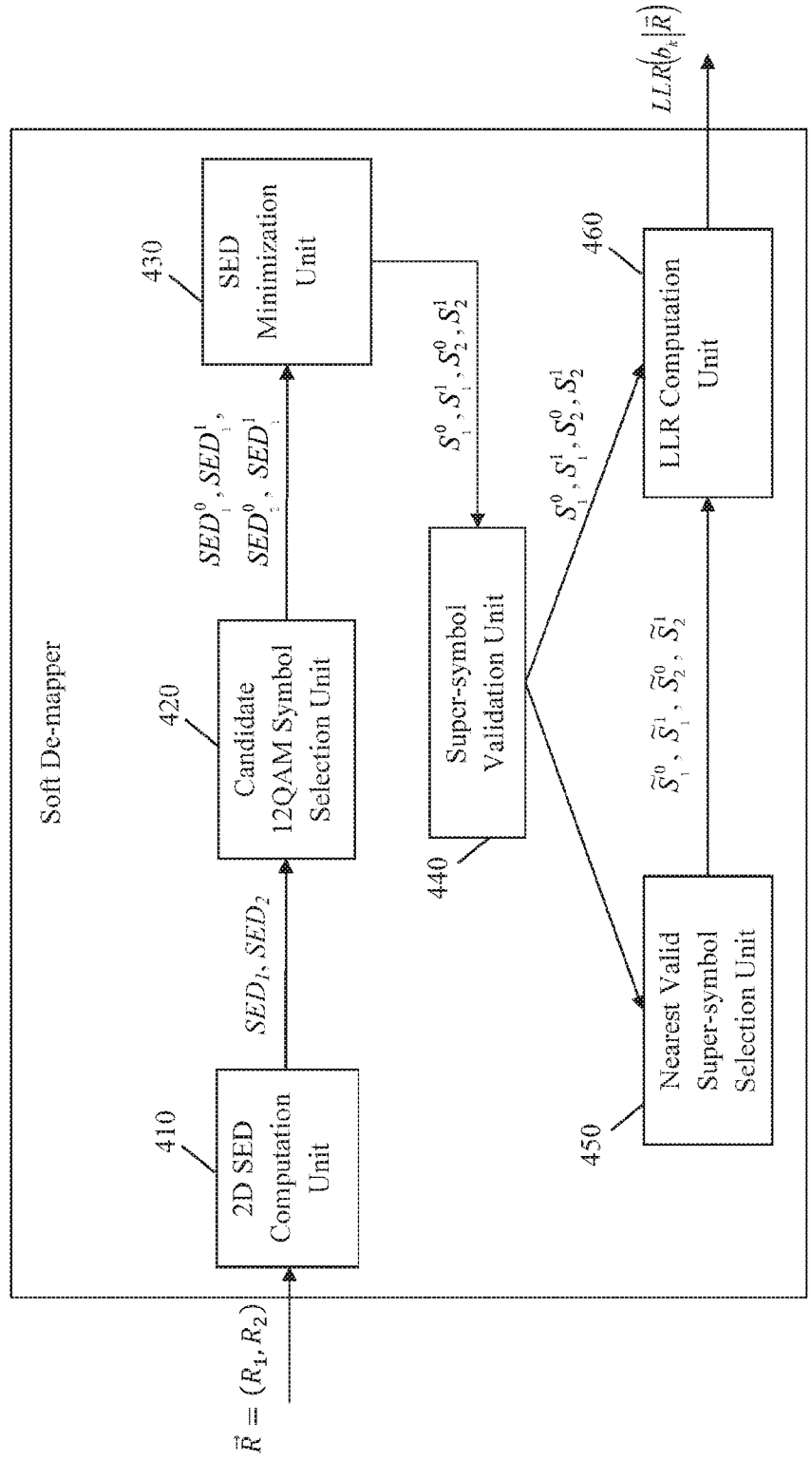
FIG. 4 is a schematic diagram of a soft de-mapper according to an embodiment of the disclosure.

FIG. 4 is a schematic diagram of a soft de-mapper 400 according to an embodiment of the disclosure. The soft de-mapper 400 is employed by a receiver DSP unit such as the demodulation unit 300. The soft de-mapper 400 produces LLRs similar to the bit-to-symbol 220. However, instead of performing joint 4D SED minimizations on a received super-symbol as shown in equation (4), the soft de-mapper 400 performs separate 2D SED minimization on each 12 QAM symbol of a received super-symbol. The soft de-mapper 400 comprises a 2D SED computation unit 410, a candidate 12 QAM symbol selection unit 420, an SED minimization unit 430, a super-symbol validation unit 440, a nearest valid super-symbol selection unit 450, and an LLR computation unit 460.

The 2D SED computation unit 410 is configured to receive an equalized signal comprising a series of super-symbols, each represented by $\vec{R}=[R_1, R_2]$, where $R_1$ represents a first 12 QAM symbol in the super-symbol $\vec{R}$ and $R_2$ represents a second 12 QAM symbol in the super-symbol $\vec{R}$. The 2D SED computation unit 410 is further configured to compute distance metrics for the first 12 QAM symbol and the second 12 QAM symbol. To compute distance metrics for the first 12 QAM symbol, 2D SEDs are computed between the first 12 QAM symbol and a first set of constellation points as shown in the constellation diagram 120. To compute distance metrics for the second 12 QAM symbol, 2D SEDs are computed between the first 12 QAM symbol and a second set of constellation points as shown in the constellation diagram 130. The first set of constellation points and the second set of constellation points are also referred to as reference symbols or ideal symbols. The first set of constellation points is represented by $\{S_1(Q_1=i, T_1=j)\}_{i=0,1,2,3 \ \& \ j=0,1,2}$, and the second set of constellation points is represented by $\{S_2(Q_2=i, T_2=j)\}_{i=0,1,2,3 \ \& \ j=0,1,2}$, where i represents a constellation quadrant and j represents a constellation point within the constellation quadrant i. The 2D SED computation unit 410 computes the 2D SEDs as follows:

$$SED_1=\{|S_1(Q_1=i,T_1=j)-R_1|^2\}_{i=0,1,2,3 \ \& \ j=0,1,2}$$

$$SED_2=\{|S_2(Q_2=i,T_2=j)-R_2|^2\}_{i=0,1,2,3 \ \& \ j=0,1,2}. \quad (5)$$

As shown in equation (5), with i varying from 0 to 3 and j varying from 0 to 2, the 2D SED computation unit 410 computes twelve 2D SEDs for each of the 12 QAM symbols $R_1$ and $R_2$ instead of 128 4D SEDs as shown in equation (4), thus significantly reducing computation complexity.

The candidate 12 QAM symbol selection unit 420 is configured to select candidate symbols for $R_1$ and $R_2$. The selection of a candidate 12 QAM symbol is dependent on the bit location and the bit value. For example, for a bit position k and a bit value $b_k$ of 0 in the super-symbol, the candidate 12 QAM symbol selection unit 420 selects a first set of candidate symbols from $\{S_1(Q_1=i,T_1=j)\}_{i=0,1,2,3 \ \& \ j=0,1,2}$ for $R_1$ and a second set of candidate symbols from $\{S_2(Q_2=i, T_2=j)\}_{i=0,1,2,3 \ \& \ j=0,1,2}$ for $R_2$. Similarly, for a bit position k and a bit value $b_k$ of 1 in the super-symbol, the candidate 12 QAM symbol selection unit 420 selects a third set of candidate symbols from $\{S_1(Q_1=i,T_1=j)\}_{i=0,1,2,3 \ \& \ j=0,1,2}$ for $R_1$ and a fourth set of candidate symbols from $\{S_2(Q_2=i, T_2=j)\}_{i=0,1,2,3 \ \& \ j=0,1,2}$ for $R_2$. The selection of the candidate symbols is described more fully below. The SEDs of the first, second, third, and fourth set of candidate symbols are expressed as follows:

$$SED_1^0=SED_1(S_1(b_k=0))$$

$$SED_2^0=SED_2(S_2(b_k=0))$$

$$SED_1^1=SED_1(S_1(b_k=1))$$

$$SED_2^1=SED_2(S_2(b_k=1)), \quad (6)$$

where $S_1(b_k=0)$, $S_2(b_k=0)$, $(S_1(b_k=1)$, and $S_2(b_k=1)$ represent the first, second, third, and fourth set of candidate symbols, respectively, and $SED_1^0$, $SED_2^0$, $SED_1^1$, and $SED_2^1$ represent the SEDs of the first, second, third, and fourth set of candidate symbols, respectively.

The SED minimization unit 430 is configured to independently select a nearest candidate symbol from each of the first, second, third, and fourth set of candidate symbols as follows:

$$S_1^0 = \underset{S}{\operatorname{argmin}}(SED_1^0)$$
$$S_2^0 = \underset{S}{\operatorname{argmin}}(SED_2^0)$$
$$S_1^1 = \underset{S}{\operatorname{argmin}}(SED_1^1)$$
$$S_2^1 = \underset{S}{\operatorname{argmin}}(SED_2^1),$$
(7)

where $S_1^0$ and $S_1^1$ represent the nearest candidate symbols for $R_1$ when $b_k=0$ and when $b_k=1$, respectively, and $S_2^0$ and $S_2^1$ represent the nearest candidate symbols for $R_2$ when $b_k=0$ and when $b_k=1$, respectively.

The super-symbol validation unit 440 is configured to determine whether a combination of $(S_1^0$ and $S_2^0)$ and a combination of $(S_1^1, S_2^1)$ for a bit $b_k$ are valid combinations for constructing a valid super-symbol. When the combinations are valid, the super-symbol validation unit 440 provides the nearest candidate symbols $S_1^0$, $S_2^0$, $S_1^1$, and $S_2^1$ to the LLR computation unit 460. The LLR computation unit 460 computes an LLR for $b_k$ as follows:

$$LLR(b_k|\vec{R}) \approx (SED_1(S_1^0) + SED_2(S_2^0)) - (SED_1(S_1^1) + SED_2(S_2^1)).$$
(8)

When any one of the combinations are invalid, the nearest valid super-symbol selection unit 450 identifies a set of valid neighboring super-symbols for the invalid symbol and selects a nearest super-symbol from the set of valid neighboring super-symbols based on joint SEDs. The joint SEDs are computed as follows:

$$SED_{neighbor}^0 = \{|S_{1,m} - R_1|^2 + |S_{2,n} - R_2|^2\}_{(m,n) \in \vec{S}(b_k=0)}$$

$$SED_{neighbor}^1 = \{|S_{1,m} - R_1|^2 + |S_{2,n} - R_2|^2\}_{(m,n) \in \vec{S}(b_k=1)},$$
(9)

where $SED_{neighbor}^0$ represents SEDs of valid neighboring super-symbols for $b_k=0$, $SED_{neighbor}^1$ represents SEDs of valid neighboring super-symbols for $b_k=1$, and $S_{1,m}$ and $S_{2,m}$ represent a first 12 QAM symbol and a second 12 QAM symbol in a neighboring super-symbol, respectively. After computing joint SEDs, the nearest valid super-symbol selection unit 450 selects a nearest valid super-symbol is selected for $b_k=0$ and $b_k=1$ as follows:

$$[\tilde{S}_1^0, \tilde{S}_2^0] = \underset{S}{\operatorname{argmin}}(SED_{neighbor}^0)$$
$$[\tilde{S}_1^1, \tilde{S}_2^1] = \underset{S}{\operatorname{argmin}}(SED_{neighbor}^1),$$
(10)

where $\tilde{S}_1^0$ and $\tilde{S}_1^0$ represent a first 12 QAM symbol and a second 12 QAM symbol of the nearest super-symbol for $b_k=0$, respectively, and $\tilde{S}_1^1$ and $\tilde{S}_2^1$ represent a first 12 QAM symbol and a second 12 QAM symbol of the nearest valid super-symbol for $b_k=1$, respectively.

After selecting the nearest valid super-symbols, the LLR computation unit 460 computes an LLR for $b_k$ as follows:

$$LLR(b_k|\vec{R}) \approx (SED_1(\tilde{S}_1^0) + SED_2(\tilde{S}_2^0)) - (SED_1(\tilde{S}_1^1) + SED_2(\tilde{S}_2^1)).$$
(11)

Figure 5:
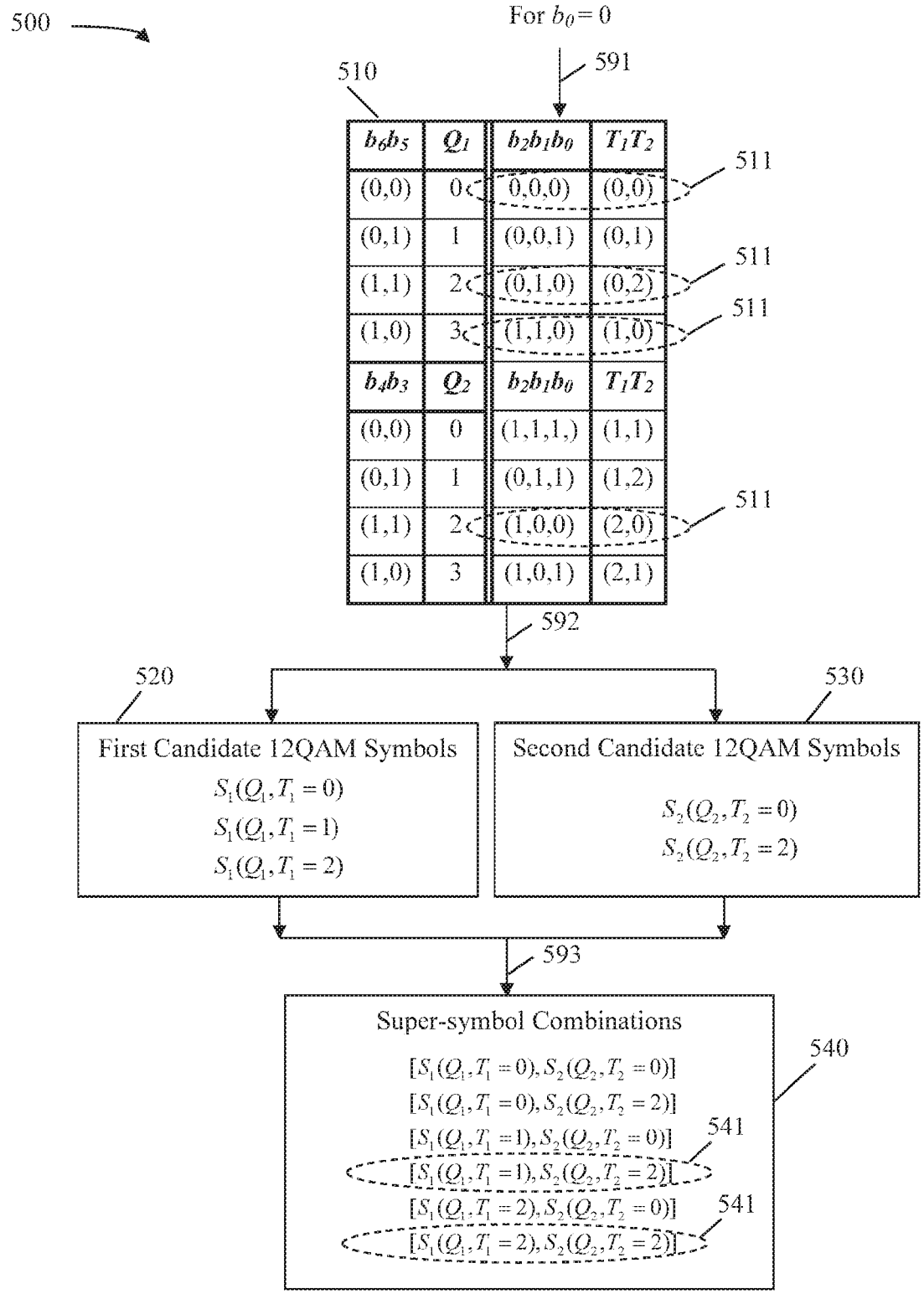
FIG. 5 illustrates a scheme for selecting candidate 12 QAM symbols and valid candidate super-symbols according to an embodiment of the disclosure.

FIG. 5 illustrates a scheme 500 for selecting candidate 12 QAM symbols and valid candidate super-symbols according to an embodiment of the disclosure. The scheme 500 is employed by a soft de-mapper such as the soft de-mapper 400. In particular, the candidate 12 QAM symbol selection unit 420 may employ the scheme 500 to compute equation (6) and the super-symbol validation unit 440 may employ the scheme 500 to validate combinations of the nearest 12 QAM symbols shown in equation (7). The scheme 500 begins with examining a bit-to-symbol table 510 similar to the table 110. The table 510 employs the same notations as the table 110, where a super-symbol is represented by 7 bits $b_6 b_5 b_4 b_3 b_2 b_1 b_0$ as shown in equation (1), a first 12 QAM symbol is represented by $S_1(Q_1, T_1)$, and a second 12 QAM symbol is represented by $S_2(Q_2, T_2)$. The scheme 500 determines valid values for $T_1$ and $T_2$ based on the bit position and the bit value of a particular bit $b_k$, for $0 \le k \le 2$. There are no restrictions on the values of $Q_1$ and $Q_2$.

The scheme 500 illustrates an example for selecting candidate 12 QAM symbols and valid super-symbols for a given bit in a received super-symbol comprising a first received 12 QAM symbol and a second received 12 QAM symbol. The scheme 500 illustrates an example for $b_0=0$. At step 591, valid values for $T_1$ and $T_2$ are identified for $b_0=0$ as indicated by 511. At step 592, a set of first candidate 12 QAM symbols 520 for the first received 12 QAM symbol and a set of second candidate 12 QAM symbols 530 for the second received 12 QAM symbol are independently determined based on valid $T_1$ values and valid $T_2$ values, respectively. For example, $SED_1^0$ and $SED_2^0$ for $k=0$ in equation (6) correspond to SEDs of the first candidate 12 QAM symbols 520 and the second candidate 12 QAM symbols 530, respectively.

At step 593, different combinations 540 of the first candidate 12 QAM symbols 520 and the second candidate 12 QAM symbols 530 are determined and invalid combinations are identified as indicated by 541. As shown, the combination of $T_1=1$ and $T_2=2$ and the combination of $T_1=2$ and $T_2=2$ are not valid for $b_0=0$. The scheme 500 may be applied to other bit positions and bit values. For example, the scheme 500 is employed to determine candidate 12 QAM symbols and valid super-symbols for $b_k=0$ and $b_k=0$, for $0 \le k \le 6$.

FIGS. 6A-6C illustrate a scheme 600 for selecting a nearest valid super-symbol for an invalid super-symbol according to an embodiment of the disclosure. The scheme 600 is employed by a soft de-mapper such as the soft de-mapper 400 upon detecting an invalid combination of first and second candidate 12 QAM symbols. In particular, the nearest valid super-symbol selection unit 450 may employ the scheme 600 to select valid neighboring super-symbols. The selection of a nearest valid super-symbol is dependent on the bit position and the bit value of a particular bit $b_k$, for $0 \le k \le 2$. As an example, $S_1(Q_1, T_1=1)$ and $S_2(Q_2, T_2=2)$ are nearest first and second 12 QAM symbols selected by an SED minimization unit such as the SED minimization unit 430 for $b_0=0$. However, the combination of $S_1(Q_1, T_1=1)$ and $S_2(Q_2, T_2=2)$ forms an invalid super-symbol $[S_1(Q_1, T_1=1, S_2(Q_2, T_2=2)]$ according to the tables 110 and 510 and the combinations 540. FIG. 6A illustrates the first 12 QAM symbol 611 of the invalid super-symbol in a constellation plane 610 according to an embodiment of the disclosure. The 12 QAM symbols 612 are neighbors of the first 12 QAM symbol 611. FIG. 6B illustrates the second 12 QAM symbol 621 of the invalid super-symbol in a constellation plane 620 according to an embodiment of the disclosure. The 12 QAM symbols 622 are neighbors of the second 12 QAM symbol 621. FIG. 6C is a table 630 illustrating valid combinations for super-symbols according to an embodiment of the disclosure. The combinations correspond to the combinations 540 that are valid. In order to reduce computational complexity, the scheme 600 identifies a set of neighboring super-symbols or combinations that are near the invalid symbol. Thus, joint SEDs in equation (9) are only computed for the set of near neighboring super-symbols. As can be seen from the constellation planes 610 and 620, the combinations ($T_1=0$, $T_2=2$) and ($T_1=1$, $T_2=0$), shown by 631, comprise shorter SEDs than the other combinations listed in table 630. The invalid symbol [$S_1(Q_1,T_1=1)$, $S_2(Q_2,T_2=2)$] and the combination ($T_1=0$, $T_2=2$) refer to the same candidate symbol for the second 12 QAM symbol. The invalid symbol [$S_1(Q_1,T_1=0$, $S_2(Q_2,T_2=2)$] and combination ($T_1=1$, $T_2=0$) refer to the same candidate symbol for the first 12 QAM symbol. Thus, equations (9) and (10) are applied to the combinations ($T_1=0$, $T_2=2$) and ($T_1=1$, $T_2=0$).

FIG. 7 is a table 700 illustrating invalid super-symbols and corresponding valid neighboring super-symbols according to an embodiment of the disclosure. The table 700 is employed by a soft de-mapper such as the soft de-mapper 400 to select valid candidate 12 QAM symbols and valid neighboring super-symbols. For example, the table 700 is generated by applying the schemes 500 and 600 to $b_k=0$ and $b_k=1$, for $0 \leq k \leq 6$. As shown, invalid super-symbols vary depending on the values and bit positions of $b_0$, $b_1$, and $b_2$, but are independent of $b_6$, $b_5$, $b_4$, and $b_3$. In some embodiments, the table 700 may be pre-determined and stored in a memory, which may be any storage device as described more fully below. In such embodiments, the soft de-mapper may perform a table look-up during candidate 12 QAM symbol selections and super-symbol validations.

Figure 8:
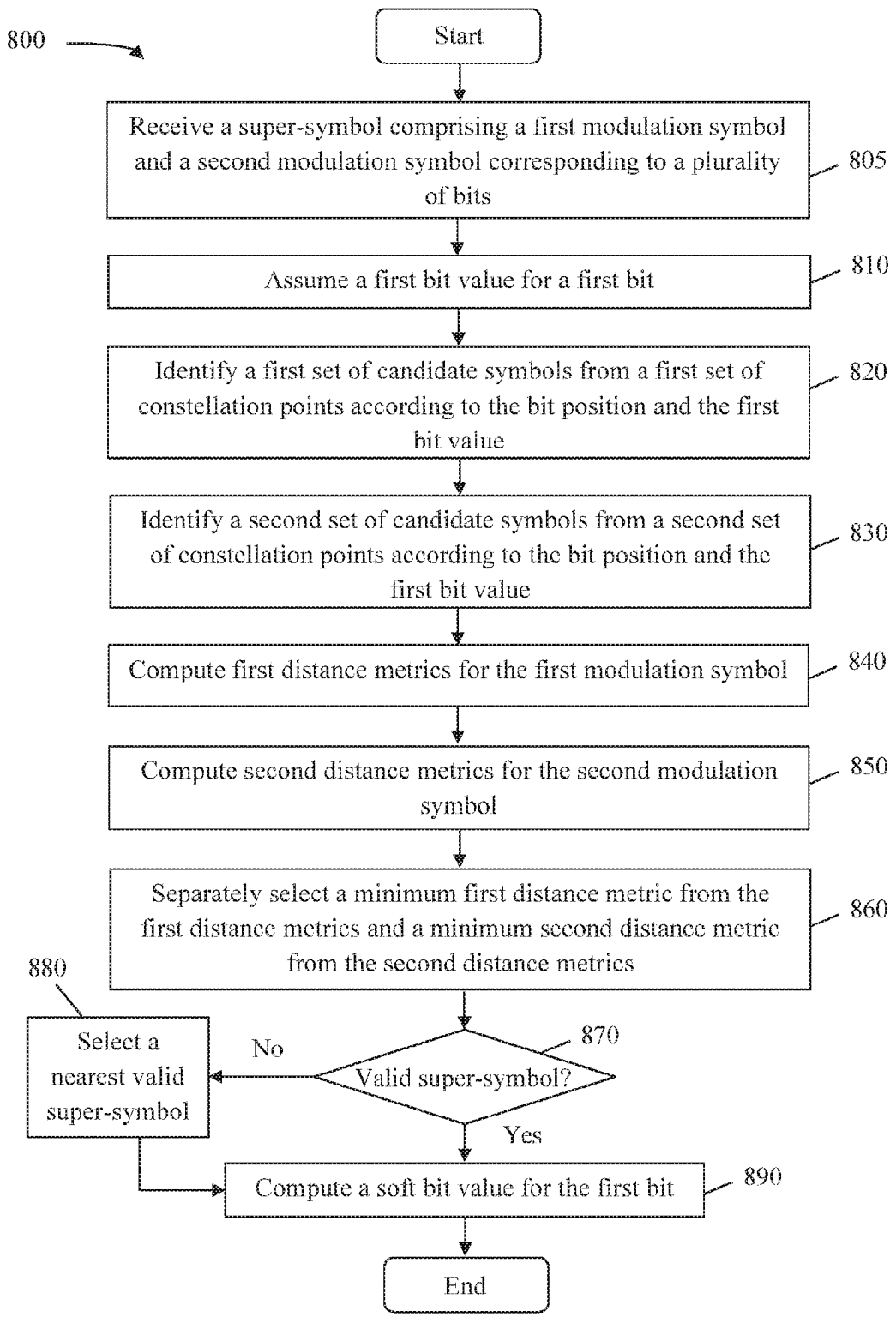
FIG. 8 is a flowchart of a method for computing a soft bit value for a super-symbol according to an embodiment of the disclosure.

FIG. 8 is a flowchart of a method 800 for determining a soft bit value for a super-symbol according to an embodiment of the disclosure. The method 800 is implemented by a soft de-mapper such as the soft de-mapper 400. The method 800 is implemented when receiving a super-symbol comprising multiple modulation symbols. For example, the super-symbol is generated by mapping bits to symbols according to the scheme 100. The method 800 employs similar mechanisms as the schemes 500 and 600. At step 805, a super-symbol comprising a first modulation symbol and a second modulation symbol corresponding to a plurality of bits is received. The first modulation symbol comprises a first modulation format and the second modulation symbol comprises a second modulation format. The first modulation format and the second modulation format may be the same or different. For example, both the first modulation format and the second modulation format are 12 QAM. The plurality of bits is mapped from a pre-determined bit-to-symbol map of the super-symbol. The plurality of bits comprises a first bit at a bit position. For example, the pre-determined bit-to-symbol map is similar to the table 110. At step 810, a first bit value is assumed for the first bit. The first bit value may be a value of 0 or 1.

At step 820, a first set of candidate symbols is selected from a first set of constellation points of the first modulation format according to the bit position and the first bit value. At step 830, a second set of candidate symbols is selected from a second set of constellation points of the second modulation format according to the bit position and the first bit value. For example, the first set of candidate symbols and the second set of candidate symbols are selected according to the table 110 by employing the scheme 500. The first set of constellation points are as shown in the constellation diagram 120. The second set of constellation points are as shown in the constellation diagram 130.

At step 840, first distance metrics are computed for the first modulation symbol. At step 850, second distance metrics are computed for the second modulation symbol. For example, the first distance metrics and second distance metrics are SEDs, which may be computed according to equation (5). The first distance metrics and the second distance metrics may be SEDs or any other suitable distance metrics.

At step 860, a selection of a minimum first distance metric from the first distance metrics is made independent of a selection of a minimum second distance metric from the second distance metrics. For example, the selections are made according to equations (6) and (7). The minimum first distance metric corresponds to a first nearest candidate symbol. The minimum second distance metric corresponds to a second nearest candidate symbol.

At step 870, a determination is made whether a combination of the first nearest candidate symbol and the second nearest candidate symbol forms a valid super-symbol. For example, the determination is made according to the scheme 500. If the combination forms a valid super-symbol, the method 800 proceeds to step 890. At step 890, a soft bit value is computed for the first bit according to equation (8). The soft bit value is computed by summing the minimum first distance metric and the minimum second distance metric. It should be noted that the soft bit value corresponds to a portion of the LLR, represented by ($SED_1(S_1^0)+SED_2(S_2^0)$) when the first bit value is 0 or ($SED_1(S_1^1)+SED_2(S_2^1)$) when the first bit value is 1.

If the combination forms an invalid super-symbol, the method 800 proceeds to step 880. At step 880, a nearest valid super-symbol is selected for the invalid super-symbol. For example, the selection is made according to the scheme 600 and the method 900, as described more fully below. After selecting a nearest valid super-symbol, the method 800 proceeds to step 890. For example, the soft bit value is computed according to the nearest valid super-symbol as shown in equation (11). The method 800 is repeated for a second bit value at step 810. For example, when the first bit value is a value of 1, the second bit value is a value of 0. Alternatively, when the first bit value is a value of 0, the second bit value is a value of 1. After computing a first soft bit value for the first bit value and a second soft bit value for the second bit value, the LLR for the first bit is computed according to equation (8).

Figure 9:
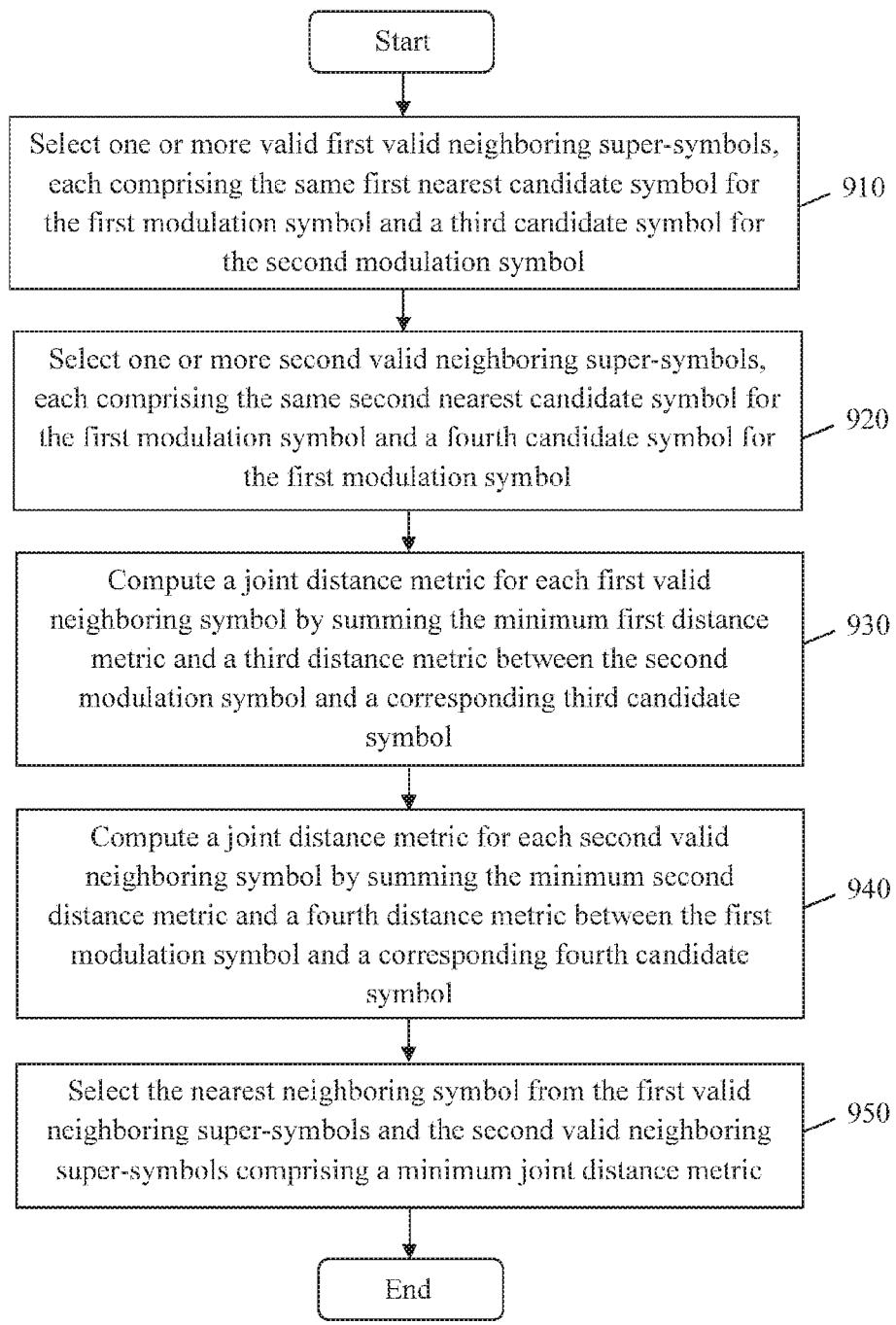
FIG. 9 is a flowchart of a method for selecting a nearest valid neighboring super-symbol according to an embodiment of the disclosure.

FIG. 9 is a flowchart of a method for selecting a nearest valid neighboring super symbol according to an embodiment of the disclosure. The method 900 is implemented by a soft de-mapper such as the soft de-mapper 400. The method 900 is implemented when detecting an invalid super-symbol during LLR calculation. For example, the method 900 may be employed by the step 890 in the method 800. The method 900 employs similar mechanisms as the schemes 500 and 600. At step 910, one or more valid first valid neighboring super-symbols are selected for the invalid super-symbol. Each first valid neighboring super-symbol comprises the same first nearest candidate symbol for the first modulation symbol and a third candidate symbol for the second modulation symbol. For example, a first valid neighboring super-symbol is selected for an invalid super-symbol [$S_1(Q_1,T_1=1)$, $S_2(Q_2,T_2=2)$] is [$S_1(Q_1,T_1=0$, $S_2(Q_2,T_2=0)$]. At step 920, one or more second valid neighboring super-symbols, each comprising the same second nearest candidate symbol is selected for the first modulation symbol and a fourth candidate symbol is selected for the first modulation symbol. For example, a first valid neighboring super-symbol is selected for an invalid super-symbol $[S_1(Q_1,T_1=1), S_2(Q_2, T_2=2)]$ is $[S_1(Q_1, T_1=0), S_2(Q_2,T_2=2)]$.

At step 930, a joint distance metric for each first valid neighboring symbol is computed by summing the minimum first distance metric and a third distance metric between the second modulation symbol and a corresponding third candidate symbol. At step 940, a joint distance metric is computed for each second valid neighboring symbol by summing the minimum second distance metric and a fourth distance metric between the first modulation symbol and a corresponding fourth candidate symbol. For example, the joint distance metrics are computed according to equation (9). At step 950, the nearest neighboring symbol is selected from the first valid neighboring super-symbols and the second valid neighboring super-symbols comprising a minimum joint distance metric according to equation (10).

Figure 10:
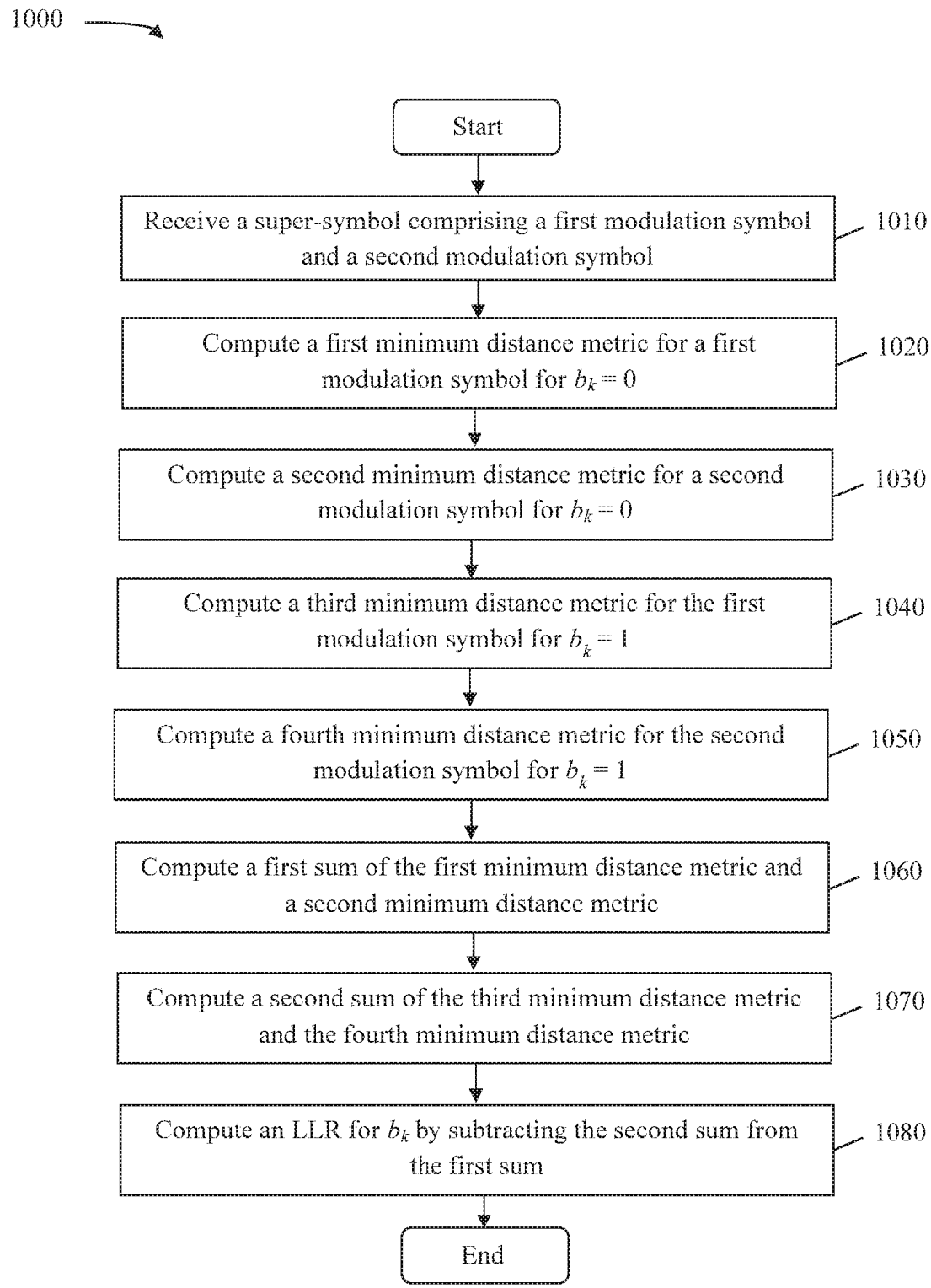
FIG. 10 is a flowchart of a method for computing a bit-level LLR according to an embodiment of the disclosure.

FIG. 10 is a flowchart of a method for computing a bit-level LLR according to an embodiment of the disclosure. The method 1000 is implemented by a soft de-mapper such as the soft de-mapper 400. The method 1000 is implemented when receiving a super-symbol comprising multiple modulation symbols. The method 1000 employs similar mechanisms as the soft de-mapper 400. The method 1000 may be implemented in conjunction with the methods 800 and 900. At step 1010, a super-symbol comprising a first modulation symbol and a second modulation symbol is received. At step 1020, a first minimum distance metric is computed for a first modulation symbol for $b_k=0$ according to equation (6). At step 1030, a second minimum distance metric is computed for a second modulation symbol for $b_k=0$. For example, the first minimum distance metric and the second distance minimum metric are computed by employing the method 900. At step 1040, a third minimum distance metric is computed for the first modulation symbol for $b_k=1$. At step 1050, a fourth minimum distance metric is computed for the second modulation symbol for $b_k=1$. For example, the third minimum distance metric and the fourth distance minimum metric are computed by employing the method 900. At step 1060, a first sum is computed for the first minimum distance metric and a second minimum distance metric. At step 1070, a second sum is computed for the third minimum distance metric and the fourth minimum distance metric. At step 1080, an LLR for $b_k$ is computed by subtracting the second sum from the first sum according to the equation (8) or (11).

In an embodiment, the separate SED minimization mechanisms employed by the soft de-mapper 400 produce the same LLRs as the joint SED minimization mechanisms based on equation (4). The joint SED minimization, represented by $SED_{joint\_min}$, is expressed as shown below:

$$SED_{joint\_min} = \min[SED_1(S_1) + SED_2(S_2)]_{(S_1, S_2 \in b_k = 0 \text{ or } 1)}, \quad (12)$$

where $S_1$ represents a first 12 QAM symbol of a super-symbol, $S_2$ represents a second 12 QAM symbol of the super-symbol, $SED_1(S_1)$ represents the SED of $S_1$, and $SED_2(S_2)$ represents the SED of $S_2$. Since $SED_1(S_1)$ and $SED_2(S_2)$ comprise positive values, a distributive property may be applied to the minimization function to produce the same result. Thus, the joint SED minimization shown in equation (12) may be transformed to two separate SED minimizations as shown below:

$$SED_{separate\_min} = \min[SED_1(S_1)]_{(S_1, S_2 \in b_k = 0 \text{ or } 1)} + \min[SED_2(S_2)]_{(S_1, S_2 \in b_k = 0 \text{ or } 1)}, \quad (13)$$

Figure 11:
FIG. 11 is a table comparing computational complexity between full LLR computation and reduced LLR computation according to an embodiment of the disclosure.

FIG. 11 is a table 1100 comparing computational complexity between full LLR computation and reduced LLR computation according to an embodiment of the disclosure. The full LLR computation performs joint SED minimization based on equation (4). The reduced LLR computation performs independent SED minimization based on equations (8) and (11). The table 1100 is generated based on floating point arithmetic operations per received bit. To include the selection of nearest valid neighboring super-symbols, the initial super-symbol in the experiment is set to an invalid super-symbol. As shown, the reduced LLR computation provides a reduction of about 75 percent (%) for additions and subtractions and a reduction of about 60% for comparison operations.

Figure 12:
FIG. 12 is a table comparing hardware complexity between full LLR computation and reduced LLR computation according to an embodiment of the disclosure.

FIG. 12 is a table 1200 comparing hardware complexity between full LLR computation and reduced LLR computation according to an embodiment of the disclosure. The full LLR computation performs joint SED minimization based on equation (4). The reduced LLR computation performs independent SED minimization based on equations (8) and (11). As shown, the reduced LLR computation provides a reduction of about 82% in gate counts.

Figure 13:
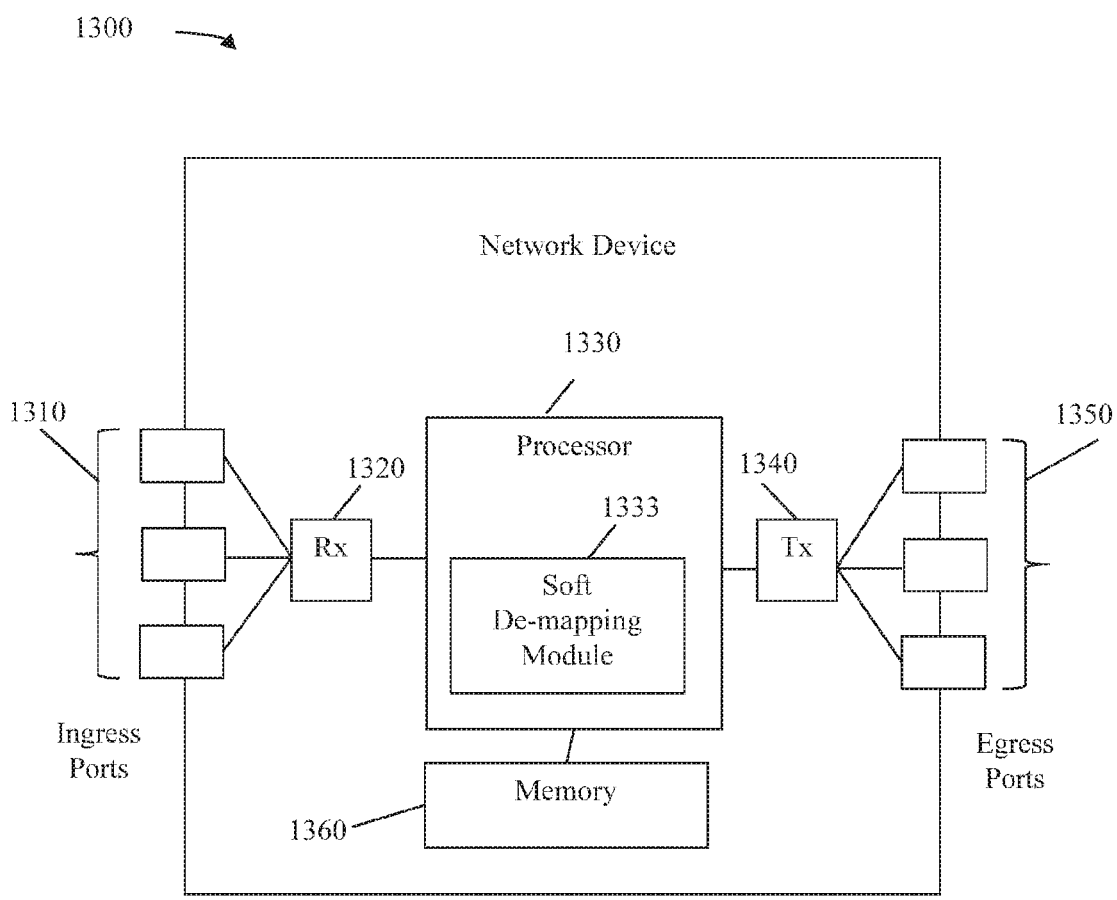
FIG. 13 is a schematic diagram of a network device according to an embodiment of the disclosure.

FIG. 13 is a schematic diagram of a network device 1300 according to an embodiment of the disclosure. The device 1300 is suitable for implementing the disclosed embodiments as described below. The device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a soft de-mapping module 1333.

The soft de-mapping module 1333 assists in implementing the disclosed embodiments described above. For instance, the soft de-mapping module 1333 implements the digital demodulation unit 300, the soft de-mapper 400, the schemes 500 and 600, and the methods 800, 900, and 1000. The inclusion of the soft de-mapping module 1333 therefore provides a substantial improvement to the functionality of the device 1300 and effects a transformation of the device 1300 to a different state. Alternatively, the soft de-mapping module 1333 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and non-volatile and may be read-only memory (ROM), random-access memory (RAM), ternary content-addressable memory (TCAM), and static random-access memory (SRAM).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a receiver configured to receive a super-symbol comprising a first modulation symbol and a second modulation symbol, wherein the first modulation symbol comprises a first modulation format, and wherein the second modulation symbol comprises a second modulation format; and
   a processor coupled to the receiver and configured to:
      select, for the first modulation symbol, a first nearest candidate symbol from a first set of candidate symbols associated with the first modulation format;
      select, for the second modulation symbol, a second nearest candidate symbol independent of the first nearest candidate symbol from a second set of candidate symbols associated with the second modulation format;
      determine, when a first combination of the first nearest candidate symbol and the second nearest candidate symbol forms a first valid super-symbol according to a pre-determined bit-to-symbol map of the super-symbol, a soft decision value for a first bit in the super-symbol according to the first nearest candidate symbol and the second nearest candidate symbol; and
      select, when the first combination forms an invalid super-symbol according to the pre-determined bit-to-symbol map, a set of valid neighboring super-symbols, each comprising a third candidate symbol and a fourth candidate symbol, wherein the third candidate symbol corresponds to the first nearest candidate symbol or the second nearest candidate symbol.

2. The apparatus of claim 1, wherein the first modulation format comprises a first plurality of constellation points, wherein the second modulation format comprises a second plurality of constellation points, and wherein the processor is further configured to:
   select the first set of candidate symbols for the first modulation symbol from the first plurality of constellation points according to a bit position of the first bit and a bit value of the first bit in the pre-determined bit-to-symbol map; and
   select the second set of candidate symbols for the second modulation symbol from the second plurality of constellation points according to the bit position and the bit value.

3. The apparatus of claim 2, wherein the processor is further configured to:
   compute first distance metrics according to the first modulation symbol and the first set of candidate symbols; and
   compute second distance metrics according to the second modulation symbol and the second set of candidate symbols,
   wherein the first nearest candidate symbol comprises a minimum first distance metric among the first set of candidate symbols, and
   wherein the second nearest candidate symbol comprises a minimum second distance metric among the second set of candidate symbols.

4. The apparatus of claim 3, wherein the first distance metrics and the second distance metrics are square Euclidean distances (SEDs).

5. The apparatus of claim 3, wherein the processor is further configured to further determine the soft decision value by computing a sum of the minimum first distance metric and the minimum second distance metric.

6. The apparatus of claim 5, wherein the bit value comprises a value of zero, and wherein the processor is further configured to:
   select a third set of candidate symbols for the first modulation symbol from the first plurality of constellation points according to the bit position and a second bit value of one for the first bit;
   select a fourth set of candidate symbols for the second modulation symbol from the second plurality of constellation points according to the bit position and the second bit value;
   compute third distance metrics according to the first modulation symbol and the third set of candidate symbols; and
   compute fourth distance metrics according to the second modulation symbol and the fourth set of candidate symbols.

7. The apparatus of claim 6, wherein the processor is further configured to:
   select a third nearest candidate symbol for the first modulation symbol from the third set of candidate symbols comprising a minimum third distance metric;
   select a fourth nearest candidate symbol for the second modulation symbol from the fourth set of candidate symbols comprising a minimum fourth distance metric;
   determine that a second combination of the third nearest candidate symbol and the fourth nearest candidate symbol forms a second valid super-symbol according to the pre-determined bit-to-symbol map; and
   further determine the soft decision value by subtracting the minimum third distance metric and the minimum fourth distance metric from the sum.

8. The apparatus of claim 2, wherein the processor is further configured to:
   compute a joint distance metric for each valid neighboring super-symbol according to the first modulation symbol, the second modulation symbol, a corresponding third candidate symbol of each valid neighboring super-symbol, and a corresponding fourth candidate symbol of each valid neighboring super-symbol;

select a nearest super-symbol from the set of valid neighboring super-symbols comprising a minimum joint distance metric; and further determine the soft decision value according to the minimum joint distance metric.

9. The apparatus of claim 1, wherein the first modulation symbol and the second modulation symbol are 12 quadrature-amplitude modulation (12QAM) symbols.

10. The apparatus of claim 1, wherein the apparatus is an optical receiver.

11. A method comprising:

receiving a super-symbol comprising a first modulation symbol and a second modulation symbol corresponding to a plurality of bits, wherein the plurality of bits comprises a first bit at a bit position;

assuming a first bit value for the first bit;

computing first distance metrics for the first modulation symbol according to the bit position and the first bit value;

computing second distance metrics for the second modulation symbol according to the bit position and the first bit value;

selecting from the first distance metrics a minimum first distance metric corresponding to a first nearest candidate symbol;

selecting from the second distance metrics a minimum second distance metric corresponding to a second nearest candidate symbol;

determining whether a first combination of the first nearest candidate symbol and the second nearest candidate symbol forms a first valid super-symbol according to a pre-determined bit-to-symbol map; and computing a soft bit value based on the determining.

12. The method of claim 11, wherein the first modulation symbol comprises a first modulation format comprising a first set of constellation points, wherein the second modulation symbol comprises a second modulation format comprising a second set of constellation points, wherein computing the first distance metrics comprises:

identifying a first set of candidate symbols from the first set of constellation points according to the bit position and the first bit value in the pre-determined bit-to-symbol map; and computing first squared Euclidean distances (SEDs) between the first modulation symbol and the first set of constellation points, and wherein computing the second distance metrics comprises:

identifying a second set of candidate symbols from the second set of constellation points according to the bit position and the first bit value in the pre-determined bit-to-symbol map; and computing second SEDs between the second modulation symbol and the second set of constellation points.

13. The method of claim 12, wherein the first bit value comprises a value of zero, wherein the method further comprises:

assuming a second bit value of one for the first bit;

computing third distance metrics for the first modulation symbol according to the bit position and the second bit value in the pre-determined bit-to-symbol map;

computing fourth distance metrics for the second modulation symbol according to the bit position and the second bit value in the pre-determined bit-to-symbol map; and determining a log-likelihood ratio (LLR) for the first bit by separately selecting a minimum third distance metric from the third distance metrics and a minimum fourth distance metric from the fourth distance metrics.

14. The method of claim 13, wherein the fourth minimum distance metric corresponds to a fourth nearest candidate symbol, and wherein the determining the LLR further comprises:

determining that the first combination forms the first valid super-symbol according to the pre-determined bit-to-symbol map; and determining that a second combination of the third nearest candidate symbol and the fourth nearest candidate symbol forms a second valid super-symbol according to the pre-determined bit-to-symbol map.

15. The method of claim 14, wherein the determining the LLR further comprises:

adding the minimum first distance metric and the minimum second distance metric to produce a first sum;

adding the minimum third distance metric and the minimum third distance metric to produce a second sum; and subtracting the second sum from the first sum to produce the LLR.

16. The method of claim 11, further comprising determining a log-likelihood ratio (LLR) for the first bit by:

determining that the first combination forms an invalid super-symbol according to the pre-determined bit-to-symbol map;

selecting one or more first valid neighboring super-symbols, each comprising the same first nearest candidate symbol for the first modulation symbol and a third candidate symbol for the second modulation symbol;

selecting one or more second valid neighboring super-symbols, each comprising the same second nearest candidate symbol for the first modulation symbol and a fourth candidate symbol for the first modulation symbol; and selecting a nearest super-symbol from the first valid neighboring super-symbols and the second valid neighboring super-symbols.

17. The method of claim 16, wherein the selecting the nearest super-symbol comprises:

computing a joint distance metric for each first valid neighboring symbol by summing the minimum first distance metric and a third distance metric between the second modulation symbol and a corresponding third candidate symbol;

computing a joint distance metric for each second valid neighboring symbol by summing the minimum second distance metric and a fourth distance metric between the first modulation symbol and a corresponding fourth candidate symbol; and selecting a nearest neighboring symbol from the first valid neighboring super-symbols and the second valid neighboring super-symbols comprising a minimum joint distance metric, and wherein the determining the LLR further comprises generating the LLR according to the minimum joint distance metric.

18. An optical device comprising:

a receiver coupled to an optical communication system and configured to receive an optical signal carrying a super-symbol comprising a first 12 quadrature-amplitude modulation (12QAM) symbol and a second 12QAM symbol corresponding to a plurality of bits in a pre-determined bit-to-symbol map, wherein the plurality of bits comprises a first bit at a bit position; and a soft decision generation unit coupled to the receiver and configured to:
   assume a first bit value for the first bit;
   select, for the first 12QAM symbol, a first set of candidate symbols from a plurality of reference 12QAM symbols according to the bit position and the first bit value;
   select, for the second 12QAM symbol, a second set of candidate symbols from a plurality of reference 12QAM symbols according to the bit position and the first bit value;
   compute first squared Euclidean distances (SEDs) between the first 12QAM symbol and the first set of candidate symbols;
   compute second SEDs between the second 12QAM symbol and the second set of candidate symbols; and
   determine a log-likelihood ratio (LLR) for the first bit by separately selecting a minimum first SED from the first SEDs and a minimum second SED from the second SEDs.

19. The optical device of claim 18, wherein the soft decision generation unit is further configured to determine the LLR by:
   determining that a combination of a first nearest candidate symbol corresponding to the minimum first SED and a second nearest candidate symbol corresponding to the minimum second SED forms a valid super-symbol according to a pre-determined bit-to-symbol map of the super-symbol; and
   summing the minimum first SED and the minimum second SED.

20. The optical device of claim 18, wherein the soft decision generation unit is further configured to:
   determine that a combination of a first nearest candidate symbol corresponding to the minimum first SED and a second nearest candidate symbol corresponding to the minimum second SED forms an invalid super-symbol according to the pre-determined bit-to-symbol map;
   select a set of valid neighboring super-symbols, each comprising a third candidate symbol and a fourth candidate symbol, wherein the third candidate symbol corresponds to the first nearest candidate symbol or the second nearest candidate symbol;
   compute a joint distance metric for each valid neighboring super-symbol according to the first 12QAM symbol, the second 12QAM symbol, a corresponding third candidate symbol of each valid neighboring super-symbol, and a corresponding fourth candidate symbol of each valid neighboring super-symbol;
   select a nearest super-symbol from the set of valid neighboring super-symbols comprising a minimum joint distance metric; and
   further determine the LLR according to the minimum joint distance metric.

\* \* \* \* \*

UNITED STATES PATENT AND TRADEMARK OFFICE
CERTIFICATE OF CORRECTION

PATENT NO. : 9,819,423 B2
APPLICATION NO. : 14/990004
DATED : November 14, 2017
INVENTOR(S) : Clarence Kan et al.

It is certified that error appears in the above-identified patent and that said Letters Patent is hereby corrected as shown below:

On the Title Page

The Abstract should read:
An apparatus comprising a receiver configured to receive a super-symbol comprising a first modulation symbol and a second modulation symbol, wherein the first modulation symbol comprises a first modulation format, and wherein the second modulation symbol comprises a second modulation format, and a processor coupled to the receiver and configured to select, for the first modulation symbol, a first nearest candidate symbol from a first set of candidate symbols associated with the first modulation format, select, for the second modulation symbol, a second nearest candidate symbol independent of the first nearest candidate symbol from a second set of candidate symbols associated with the second modulation format, and determine a soft decision value for a first bit in the super-symbol according to the first nearest candidate symbol and the second nearest candidate symbol.

In the Claims

Column 20, Lines 5-16, Claim 14 should read:
14. The method of claim 13, wherein the third minimum distance metric corresponds to a third nearest candidate symbol, wherein the fourth minimum distance metric corresponds to a fourth nearest candidate symbol, and wherein the determining the LLR further comprises:
    determining that the first combination forms the first valid super-symbol according to the pre-determined bit-to-symbol map; and
    determining that a second combination of the third nearest candidate symbol and the fourth nearest candidate symbol forms a second valid super-symbol according to the pre-determined bit-to-symbol map.

Signed and Sealed this
Eighth Day of May, 2018

Andrei Iancu
*Director of the United States Patent and Trademark Office*